United States Patent
Nakanishi et al.

(10) Patent No.: US 8,381,549 B2
(45) Date of Patent: Feb. 26, 2013

(54) OPTICAL FIBER PREFORM FABRICATING METHOD

(75) Inventors: Tetsuya Nakanishi, Yokohama (JP); Tetsuya Haruna, Yokohama (JP); Shinji Ishikawa, Yokohama (JP)

(73) Assignee: Sumitomo Electric Industries, Ltd., Konohana-ku (JP)

( * ) Notice: Subject to any disclaimer, the term of this patent is extended or adjusted under 35 U.S.C. 154(b) by 1037 days.

(21) Appl. No.: 11/921,418

(22) PCT Filed: Jun. 21, 2007

(86) PCT No.: PCT/JP2007/062516
§ 371 (c)(1),
(2), (4) Date: Nov. 30, 2007

(87) PCT Pub. No.: WO2008/001673
PCT Pub. Date: Jan. 3, 2008

(65) Prior Publication Data
US 2010/0071420 A1    Mar. 25, 2010

(30) Foreign Application Priority Data

Jun. 26, 2006 (JP) ................. P2006-175726

(51) Int. Cl.
*C03B 37/018* (2006.01)
(52) U.S. Cl. ............... 65/413; 65/417; 65/421
(58) Field of Classification Search ........... 65/413, 65/417, 421
See application file for complete search history.

(56) References Cited

U.S. PATENT DOCUMENTS

| 4,826,288 A | 5/1989 | Mansfield et al. |
| 5,961,682 A * | 10/1999 | Lee et al. ............ 65/384 |
| 2005/0229639 A1 * | 10/2005 | Otosaka et al. ............ 65/391 |

FOREIGN PATENT DOCUMENTS

| CN | 1294768 A | 5/2001 |
| EP | 1 602 630 | 12/2005 |

(Continued)

OTHER PUBLICATIONS

Schultz, "Optical Absorption of the Transition Elements in Vitreous Silica," Research and development Labortories, Corning Glass Works, Corning, New York, Jul. 1974.

(Continued)

*Primary Examiner* — Queenie Dehghan
(74) *Attorney, Agent, or Firm* — McDermott Will & Emery LLP

(57) ABSTRACT

The present invention relates to an optical fiber preform fabricating method that makes it possible to implement a reduction in iron impurities at a low cost. The optical fiber preform fabricating method comprises a glass synthesis step for forming a glass region constituting at least a part of the core area of the optical fiber. The glass synthesis step includes a deposition step of depositing glass particles containing the Al-element inside the glass pipe by means of chemical vapor deposition, and a consolidation step of obtaining a transparent glass body from the glass soot body thus obtained. In other words, the deposition step synthesizes glass particles on the inside wall of a glass pipe by feeding raw material gas, in which the content ratio (O/Al) of the O-element and Al-element is 20 or less, into the glass pipe. Furthermore, the consolidation step obtains a transparent glass body from the glass soot body by heating the glass soot body. The transparent glass body that is formed in the consolidation step constitutes part of the core region.

13 Claims, 10 Drawing Sheets

FOREIGN PATENT DOCUMENTS

| | | |
|---|---|---|
| GB | 2 118 320 | 10/1983 |
| JP | 2001-151513 A | 6/2001 |
| JP | 2003-137542 A | 5/2003 |
| JP | 2005-343731 A | 12/2005 |
| WO | WO 83/03599 | 10/1983 |

OTHER PUBLICATIONS

English translation of the International Preliminary Report on Patentability and Written Opinion of the International Searching Authority issued for International Patent Application No. PCT/JP2007/062516, mailed Jun. 21, 2007.

Chinese Office Action, w/ English translation thereof, issued in Chinese Patent Application No. CN 200780024094.4 dated Dec. 31, 2010.

European Search Report issued in European Patent Application No. 07767342.4 dated Feb. 14, 2012.

Chinese Office Action, and English translation thereof, issued in Chinese Patent Application No. 200780024094.4 dated May 17, 2012.

* cited by examiner (a)

(b)

(a)

(b)

(c)

(d)

(a)

(b)

(c)

(d)

(a)

(b)

(a)

(b)

OPTICAL FIBER PREFORM FABRICATING METHOD

RELATED APPLICATIONS

This application is the U.S. National Phase under 35 U.S.C. §371 of International Application No. PCT/JP2007/062516 filed on Jun. 21, 2007, which in turn claims the benefit of Japanese Application No. 2006-175726, filed on Jun. 26, 2006, the disclosures of which Applications are incorporated by reference herein.

TECHNICAL FIELD

The present invention relates to an optical fiber preform fabricating method, an optical fiber fabricating method and an optical fiber.

BACKGROUND ART

An optical fiber, which comprises a core region with a predetermined refractive index and a cladding region, provided at the outer periphery of the core region, having a refractive index lower than the core region, is fabricated by drawing an optical fiber preform with the same refractive index distribution. The core region is generally doped with $GeO_2$ in order to increase the refractive index of the core region but the core region is also sometimes doped with $Al_2O_3$.

In comparison with an optical fiber whose core region is doped with $GeO_2$ (hereinafter referred to as Ge-doped optical fiber), an optical fiber whose core region is doped with $Al_2O_3$ (hereinafter referred to as Al-doped optical fiber) has stable raw material costs because the Al-element occurs naturally in abundance. Furthermore, in Al-doped optical fiber, there is the possibility of a contribution to reduced loss on account of its small Rayleigh scattering coefficient. Patent Document 1 discloses a technology for fabricating an Al-doped optical fiber.

However, Al-doped optical fiber has hitherto not been put to practical use. This is because it has proven actually extremely difficult to reduce transmission loss (Non-patent Document 1). Causes of the transmission loss that occurs with Al-doped optical fibers include the crystallization of $Al_2O_3$ and the incorporation of impurities.
[Patent Document 1] U.S. Pat. No. 4,826,288
[Non-patent Document 1] P. C. Schultz, Journal of the American Ceramic Society, Vol. 57, No. 7, pages 309 to 313 (1974)

DISCLOSURE OF THE INVENTION

Problem to be Solved by the Invention

The inventors have studied conventional method of fabricating optical fiber preforms in detail, and as a result, have found problems as follows.

That is, the problem with the crystallization of $Al_2O_3$ in Al-doped optical fiber can be solved by keeping the processing temperature when the optical fiber preform is created at or below the crystal generation temperature and by increasing the cooling speed when the optical fiber preform is drawn.

On the other hand, the incorporation of impurities has naturally been difficult to avoid. Reasons for this include the fact that the ionization tendency of Al is close to the ionization tendency of iron and, therefore, in the process of purification of $AlCl_3$ that is used at the time of fabrication of the optical fiber preform, it is difficult to completely remove the iron component. Furthermore, $AlCl_3$ is a solid at room temperature and a high temperature environment of 140° C. or more is required in order for $AlCl_3$ to be utilized as a gas. However, in this case, because the vaporization pressure of iron chloride is high, it has proven problematic to easily prevent the incorporation of iron into the raw materials in the normal supply and provision of the raw material. As a result, it has been difficult to implement a low cost reduction in iron impurities in the fabrication of Al-doped optical fiber.

In order to overcome the above-mentioned problems, it is an object of the present invention to provide a method of fabricating an optical fiber preform that allows a reduction of iron impurities to be implemented at low cost, a method of fabricating optical fiber that uses an optical fiber preform obtained by means of the optical fiber preform fabricating method, and an optical fiber that is obtained using the optical fiber fabricating method.

Means for Solving Problem

An optical fiber preform fabricating method according to the present invention fabricates an optical fiber preform which has a central glass region to be a core region of the optical fiber and a peripheral glass region to be a cladding region. Particularly, the optical fiber preform fabricating method comprises a glass synthesis step of synthesizing glass containing the Al-element to form a region constituting at least part of the central glass region to be the core region, by applying heat or a high frequency electro magnetic field to a raw material gas, in which the content ratio (O/Al) of the O-element and Al-element is 20 or less.

More specifically, the glass synthesis step preferably includes, in the case of soot process, a deposition step and a consolidation step. In the deposition step, a glass soot body containing the Al-element is synthesized on the inside wall of a glass pipe by feeding raw material gas, in which the content ratio (O/Al) of the O-element and Al-element is 20 or less, into the glass pipe. In the consolidation step, a transparent glass body is obtained from the glass soot body by heating the glass soot body. On the other hand, in the case of the direct vitrification process, a glass layer containing the Al-element, in the glass synthesis step, on the inside wall of the glass pipe by feeding a raw material gas, in which the content ratio (O/Al) of the O-element and Al-element is 20 or less, into the glass pipe. Even when assuming the application to the OVD method or VAD method, the glass synthesis step preferably includes a deposition step and a consolidation step. In this case, during the deposition step, the glass soot body containing the Al-element is synthesized on the starting material which is placed in the reacting furnace, by feeding a gas, in which the content ratio (O/Al) of the O-element and Al-element is 20 or less, into the reacting furnace. The synthesis of the glass soot body or glass layer may also be repeated a plurality of times.

The glass pipe, prepared in the deposition step preferably, has a lower viscosity than the synthesized glass soot body containing Al. This is so that the shaping of the glass pipe into a non-circle in the collapsing step carried out after the deposition step is adequately suppressed. A high-viscosity buffer glass layer may also be deposited on the inside wall of the glass pipe prior to the deposition step. In this case, the buffer glass layer deposited on the inside wall of the glass pipe has a higher viscosity than that of the glass pipe. The glass soot body synthesized in the deposition step is formed on the surface of the buffer glass layer.

In accordance with the optical fiber preform fabricating method according to the present invention, the incorporation of metal impurities can be effectively prevented by utilizing a conventional raw material supply system such as the one that appears in U.S. Pat. No. 4,826,288, for example. Hence, the optical fiber preform with which the incorporation of iron impurities is effectively reduced can be fabricated at a low cost.

The optical fiber preform fabricating method according to the present invention may also comprise a purification step provided between the deposition step and the consolidation step. The purification step removes impurities contained in the glass soot body by exposing the glass soot body synthesized in the deposition step to a Cl-gas atmosphere. A lower-loss Al-doped optical fiber can be obtained through the provision of such a purification step.

In addition, the optical fiber preform fabricating method according to the present invention further comprises a doping step provided between the deposition step and consolidation step. The doping step dopes the glass soot body synthesized in the deposition step with another element other than Al by exposing the glass soot body to a gas atmosphere containing the other element. An optical fiber having a core region with a relatively high refractive index can be obtained through the provision of such a doping step.

In the deposition step of the optical fiber preform fabricating method according to the present invention, glass particles may also be synthesized inside the glass pipe by means of chemical vapor deposition while feeding the other element other than Al into the glass pipe in use of a carrier gas other than O. In this case, a glass soot body that contains the Al-element and another element is synthesized with the inside wall of the glass pipe. An optical fiber with a core region of a relatively high refractive index can be obtained by synthesizing the glass soot body that contains the Al-element and the other element in the deposition step.

In the deposition step of the optical fiber preform fabricating method according to the present invention, the raw material gas thus supplied contains $AlCl_3$ and the temperature of a bubbler for supplying the $AlCl_3$ is preferably 150° C. or less. As a result of this constitution, the differential of the Fe-induced transmission loss can be suppressed by means of the optical fiber that is fabricated from this optical fiber preform.

An optical fiber fabricating method according to the present invention prepares an optical-fiber preform that is fabricated by means of the optical fiber preform fabricating method (the optical fiber preform fabricating method according to the present invention), and then fabricates an optical fiber by drawing the optical fiber preform thus prepared. The optical fiber that is fabricated in this manner (the optical fiber according to the present invention) comprises a core region comprised of a silica-based glass doped with $Al_2O_3$ at 8 wt % or more, and has a transmission loss of 20 dB/km or less at a wavelength of 1550 nm.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

Effect of the Invention

In accordance with the present invention, the reduction in iron impurities can be implemented at low cost by the optical fiber preform fabricating method for obtaining an Al-coped optical fiber.

DESCRIPTION OF THE REFERENCE NUMERALS

1 . . . optical fiber preform; and 2 . . . optical fiber (coated optical fiber).

BEST MODES FOR CARRYING OUT THE INVENTION

In the following, embodiments of the optical fiber preform fabricating method, optical fiber fabricating method, and optical fiber according to the present invention will be explained in detail with reference to FIGS. 1 to 10. In the explanation of the drawings, constituents identical to each other will be referred to with numerals identical to each other without repeating their overlapping descriptions.

When the optical fiber preform used for the Al-doped optical fiber is fabricated, $AlCl_3$ is employed. The $AlCl_3$ is a solid at room temperature and must be held at a high temperature of at least 100° C. in order to be introduced as a gas to the chamber in which the optical fiber preform fabrication is carried out. On the other hand, generally, a minute amount of iron remains in the $AlCl_3$ purification step even after a careful $AlCl_3$ purification step. In addition, where the glass fabrication equipment is concerned, as means for introducing the $AlCl_3$ gas into the chamber, piping containing iron such as stainless steel is often employed. However, because $FeCl_3$ starts to invade the process line at temperatures at or above 100° C., the incorporation of $FeCl_3$ into the chamber at the same time as the $AlCl_3$ gas has proven unavoidable. Oxides of Fe ($Fe_2O_3$, for example) have absorption in the communication wavelength band of the optical fiber and, therefore, the transmission loss of the optical fiber is caused to deteriorate. Such deterioration of the transmission loss starts to appear prominently when the $Al_2O_3$ concentration in the core region of the optical fiber is roughly 8 wt % or more.

Figure 1:
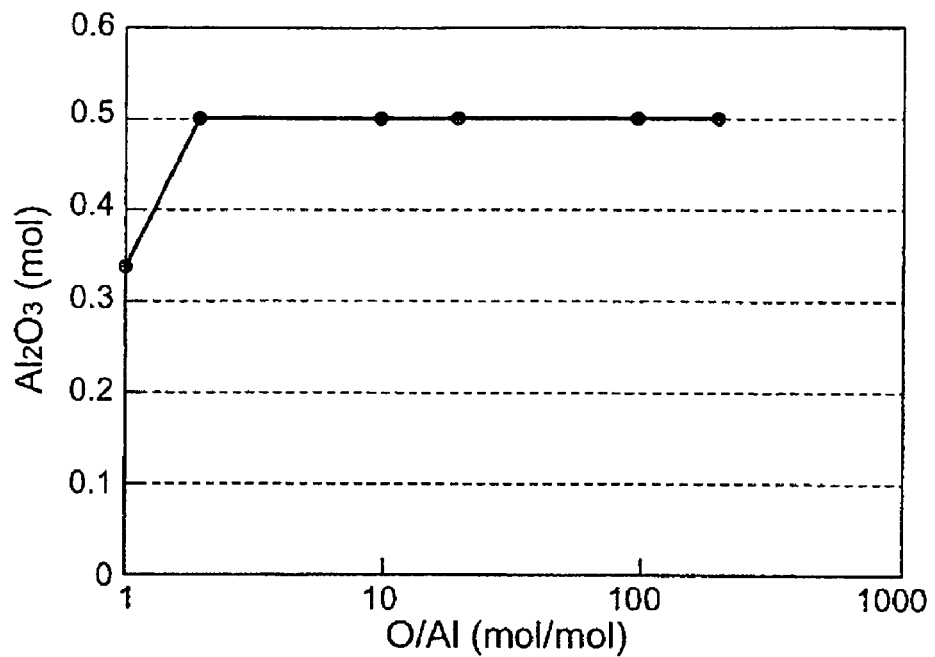
FIG. 1 is a graph showing the relationship between the content ratio (O/Al) of the O-element and Al-element in a gas that comprises $Al_2O_3$ and the respective amounts of $Al_2O_3$ and $Fe_2O_3$ generated.
Figure 1:
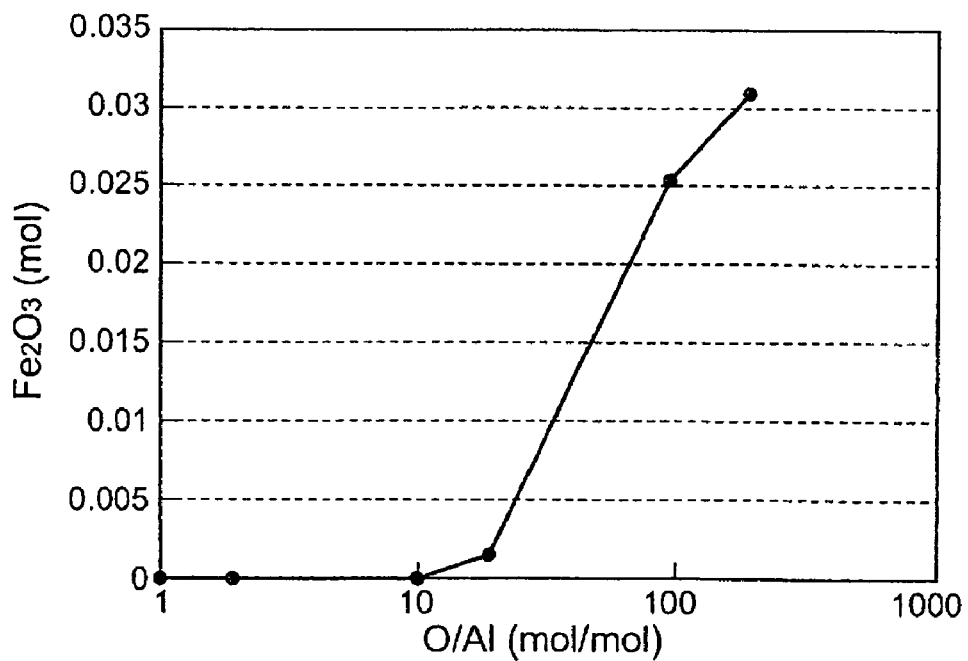

Therefore, the present inventors discovered that it is possible to avoid the incorporation of iron into glass by utilizing the fact that the strength of oxidation of Fe is weak as compared with Al. In FIG. 1, the area (a) is a graph showing the relationship of the amount of $Al_2O_3$ generated with respect to the content ratio (O/Al) of the O-element and Al-element in a raw material gas introduced into the chamber. Further, the area (b) is a graph showing the relationship of the amount of $Fe_2O_3$ generated with respect to the content ratio (O/Al) of the O-element and Al-element in a gas comprising $Al_2O_3$. As can be seen from these graphs, when the ratio (O/Al) is 20 or less, the generation of the $Al_2O_3$ is not lowered and the generation of $Fe_2O_3$ can be suppressed. When, more preferably, the ratio (O/Al) is equal to or less than the stoichiometric ratio of $Al_2O_3$ (that is, the ratio (O/Al) is 1.5 or less), although $Al_2O_3$ is generated, $Fe_2O_6$, which is an exemplary oxide of iron, is not generated. As a result, a glass without absorption loss caused by Fe oxide can be produced.

Therefore, in the optical fiber preform fabricating method according to the present invention, in the deposition step in which a glass soot body containing the Al-element is synthesized, a gas, in which the content ratio (O/Al) of the O-element and Al-element is 20 or less (preferably 1.5 or less), is fed into a glass pipe, and glass particles are deposited by means of chemical vapor deposition within the glass pipe. In the subsequent consolidation step, a transparent glass body is obtained from the glass soot body by heating the glass soot body synthesized in the deposition step. Further, an optical fiber preform, which contains the transparent glass body formed in the consolidation step as a glass region to be part of the core region of the optical fiber, is fabricated. In addition, the optical fiber fabricating method according to the present invention prepares an optical fiber preform that is fabricated as above, and produces an optical fiber by drawing the optical fiber preform. By using the optical fiber preform that is fabricated as above, the Fe oxide content is suppressed and a low-loss Al-doped optical fiber can be fabricated at a low cost.

Figure 2:
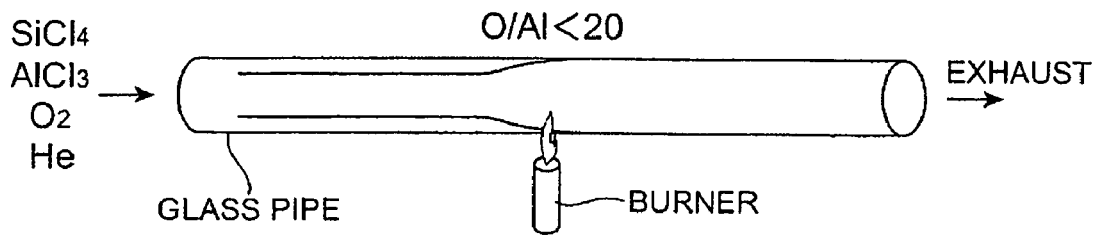
FIG. 2 is a view for explaining a first embodiment of the optical fiber preform fabricating method according to the present invention.
Figure 2:
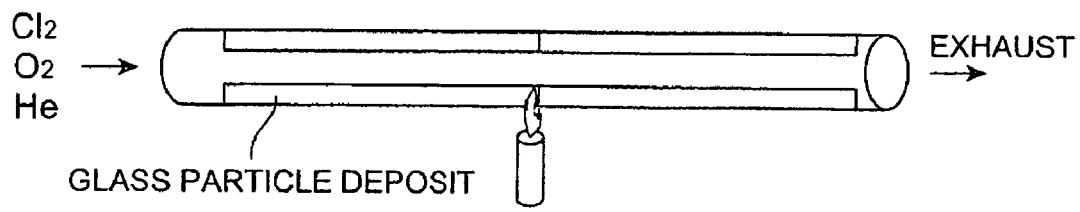
Figure 2:
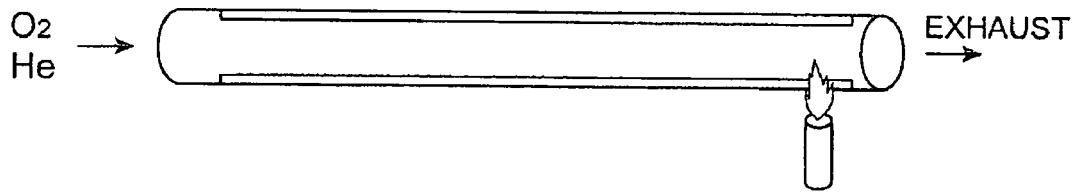
Figure 2:
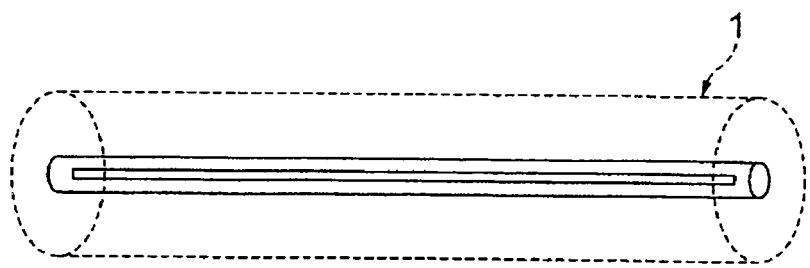

A purification step is also provided between the deposition step and consolidation step. In the purification step, the impurities (metal impurities, OH and the like), that are contained in the glass soot body generated in the deposition step, are removed by exposing the glass soot body to a Cl-gas atmosphere. FIG. 2 is a view for explaining the optical fiber preform fabricating method according to the present invention. FIG. 2 shows an optical fiber preform fabricating method that employs MCVD.

The deposition step is shown in the area (a) of FIG. 2 and, in the deposition step, $SiCl_4$, $AlCl_3$-gas, $O_2$-gas, and He-gas are fed into the glass pipe. In addition, the glass pipe is heated using a burner that moves in the longitudinal direction thereof while gas is being supplied thereto. A $SiO_2$ soot body containing the Al-element is synthesized on the inside wall of the glass pipe by means of this chemical vapor deposition. In the deposition step, the gas fed into the glass pipe has a content ratio (O/Al) for the O-element and Al-element of 20 or less (preferably 1.5 or less).

After the deposition step, a purification step as shown in the area (b) of FIG. 2 is carried out. In this purification step, $Cl_2$ gas, $O_2$ gas, and He gas are fed into the glass pipe on whose inside wall a glass soot body containing the Al-element is generated. Thereupon, a glass pipe is heated by a burner that moves in a longitudinal direction thereof. As a result of simultaneously supplying gas and performing heating in this manner, impurities contained in the glass soot body are removed. Furthermore, a consolidation step is carried out following the purification step, as shown in the area (c) of FIG. 2. In the consolidation step, a transparent glass body is formed from the glass soot body by a burner heating to the glass soot body.

The glass pipe that has undergone the consolidation step is collapsed, whereby a core rod of the optical fiber preform is obtained. A glass region that is to become the cladding region is also formed on the outer periphery of the core rod or a plurality of glass regions each with a different refractive index which are to form the outer region of the core region and the cladding region are sequentially formed, and an optical fiber preform 1 that is shown in the area (d) of FIG. 2 is obtained. A low loss Al-doped optical fiber is also obtained by drawing the optical fiber preform 1.

Figure 3:
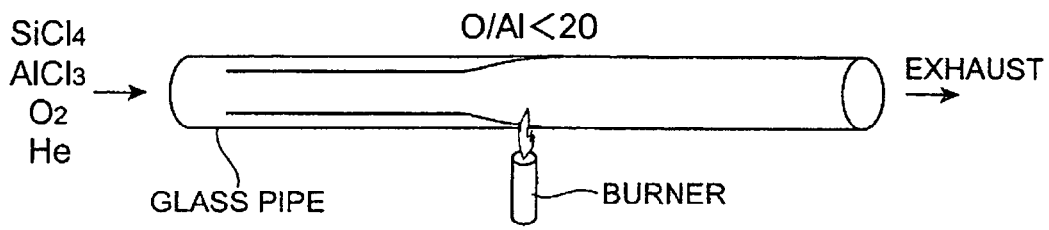
FIG. 3 is a view for explaining another embodiment of the optical fiber preform fabricating method according to the present invention.
Figure 3:
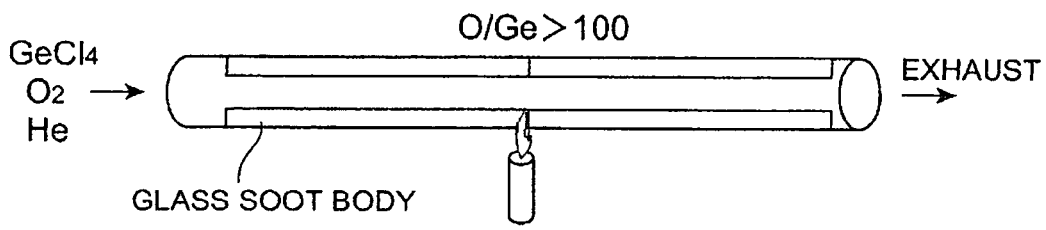
Figure 3:
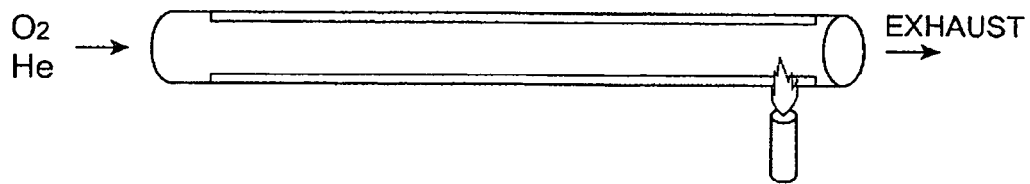
Figure 3:
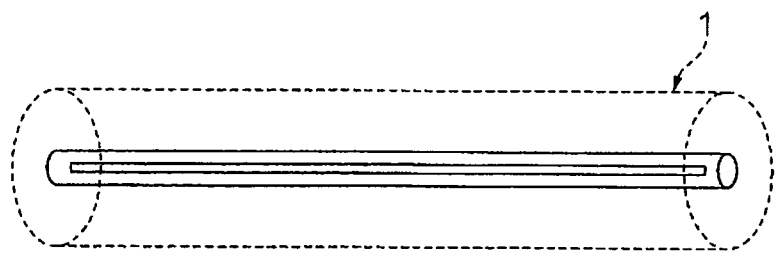

A doping step may also be provided between the deposition step and consolidation step. The doping step exposes the glass soot body synthesized in the deposition step to an atmosphere of a gas containing another element other than Al (Ge or P or the like, for example) and doping the glass soot body with the other element. In the doping step, a suitable oxygen partial pressure that corresponds to the element with which the glass soot body is doped is adjusted. FIG. 3 is a view for explaining the optical fiber preform fabricating method according to the present invention that includes a consolidation step. FIG. 3 also shows an optical fiber preform fabricating method that employs MCVD.

Although the fabrication step is shown in the area (a) of FIG. 3, the deposition step is the same as the deposition step shown in the area (a) of FIG. 2. After the deposition step, the consolidation step is carried out as shown in the area (b) of FIG. 3. The consolidation step heats the glass pipe by moving a burner in the longitudinal direction of the glass pipe while feeding $GeCl_4$ gas, $O_2$-gas, and He-gas into the glass pipe that has the glass soot body containing the Al-element synthesized with the inside wall surface thereof. As a result, the glass soot body is doped with $GeO_2$. Thereupon, the content ratio (O/Ge) of the O element and Ge-element in the gas that is supplied is 100 or more. The area (c) of FIG. 3 shows the consolidation step that is carried out after the doping step but the consolidation step is the same as the consolidation step shown in the area (c) of FIG. 2. In addition, the optical fiber preform 1 that is used for the Al-doped optical fiber is obtained as shown in the area (d) of FIG. 3 by forming a variety of glass regions each with a different refractive index at the outer periphery of the core rod obtained by collapsing the glass pipe formed as described above.

As described above, by co-doping another element in addition to Al into the glass region that is to be at least part of the core region of the optical fiber thus obtained, it becomes possible to fabricate a dispersion-compensating optical fiber that comprises a core region with a relatively high refractive index or a high nonlinearity fiber. However, supposing that the refractive index of the core region is raised by doping with only Al at a high concentration, as the Al-concentration increases, the crystal phase, such as the mullite or cristobalite, grows easily. In this case, the fabrication of an Al-doped optical fiber is accompanied by problems. In contrast, in cases where an element such as Ge or P is co-doped in addition to Al, the refractive index of the core region can be increased while avoiding crystallization.

For example, in cases where Ge is co-doped together with Al, it is necessary to increase the oxygen partial pressure in order to oxidize the Ge ($GeO_2$). Therefore, in the doping step that is provided separately from the deposition step, by setting the oxygen partial pressure at a value that is suited to oxide the dopant, the co-doping element can be incorporated in the glass soot body.

Further, when the Al-concentration is at least 8 wt %, cracks are readily generated. As a countermeasure, P is co-doped in addition to Al in the consolidation step. As a result of the co-doping of P together with Al, the processing temperature during the consolidation step can be reduced and the generation of cracks during the deposition of the glass particles can be prevented. Thereupon, the flow ratio of the $POCl_3$ and $AlCl_3$ ($POCl_3/AlCl_3$) is preferably 1 or less.

In addition, in the optical fiber preform fabricating method shown in FIG. 3, the glass soot body was doped with another element in a consolidation step that was provided between the deposition step and the consolidation step. However, in the deposition step, a glass soot body that contains the Al-element and another element may also be synthesized. In this case, the glass soot body is synthesized on the inside wall of the glass pipe by means of chemical vapor deposition while another element other than Al is fed into the glass pipe by using a carrier gas other than O. The synthesis of a glass soot body containing the Al-element and another element can also be carried out in a deposition step of this kind.

For example, in cases where a glass soot body containing the Al-element and P-element are synthesized in the deposition step, oxygen is generally used as the carrier gas when the raw materials are supplied while bubbling the $POCl_3$. However, supposing that the amount of $POCl_3$ supplied is increased, the oxygen which is the carrier gas is then naturally increased. In this case, the generation of Fe oxide can no longer be suppressed. Therefore, a noble gas such as helium or argon is desirably used as the carrier gas for the $POCl_3$.

Figure 4:
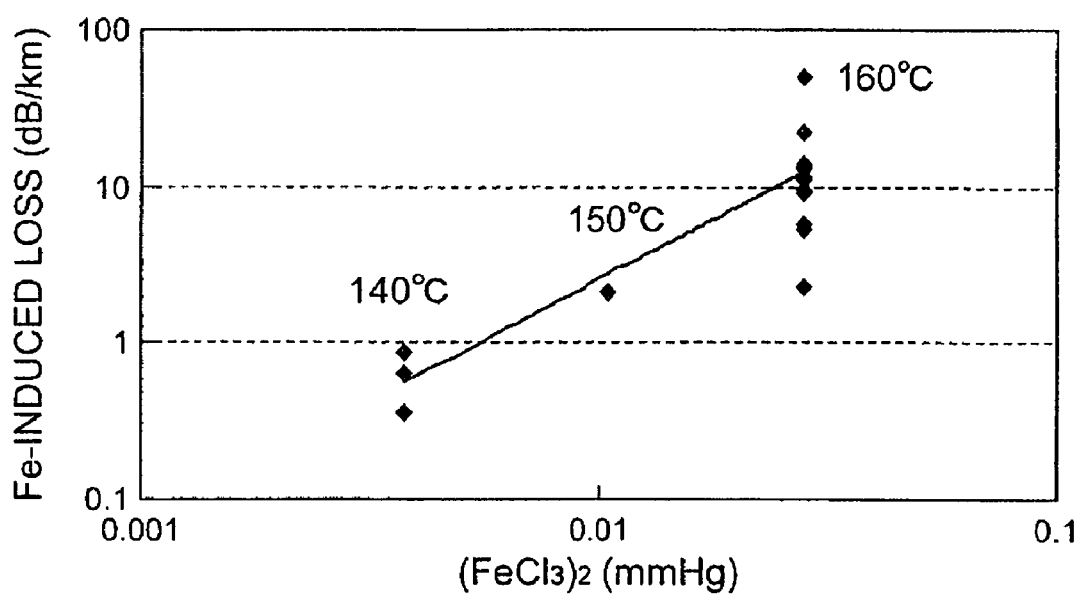
FIG. 4 is a graph showing the relationship between the differential of the Fe-induced transmission loss at wavelength 1100 nm and the vapor pressure of $(FeCl_3)_2$.

In addition, the temperature of the bubbler for supplying the $AlCl_3$ in the deposition step is preferably no more than 150° C. FIG. 4 is a graph showing the relationship between the differential of the Fe-induced transmission loss at wavelength 1100 nm and the vapor pressure of $(FeCl_3)_2$. Thus, when the vapor pressure of the $(FeCl_3)_2$ is 0.01 mmHg or less, the differential of the Fe-induced transmission loss can be significantly suppressed to 10 dB or less. In order to supply the $AlCl_3$ as gas, the temperature of the $AlCl_3$ bubbler must be 100° C. or more. However, as can be seen from the graph, the temperature of the bubbler is preferably set at 150° C. or less and more preferably set at 140° C. or less.

Even in cases where the optical fiber, which is obtained by drawing the optical fiber preform fabricated as described above, has a core comprised of silica glass doped with $Al_2O_3$ at 8 wt % or more, the transmission loss at a wavelength of 1550 nm is no more than 20 dB/km and the transmission loss is more preferably no more than 10 dB/km.

Figure 5:
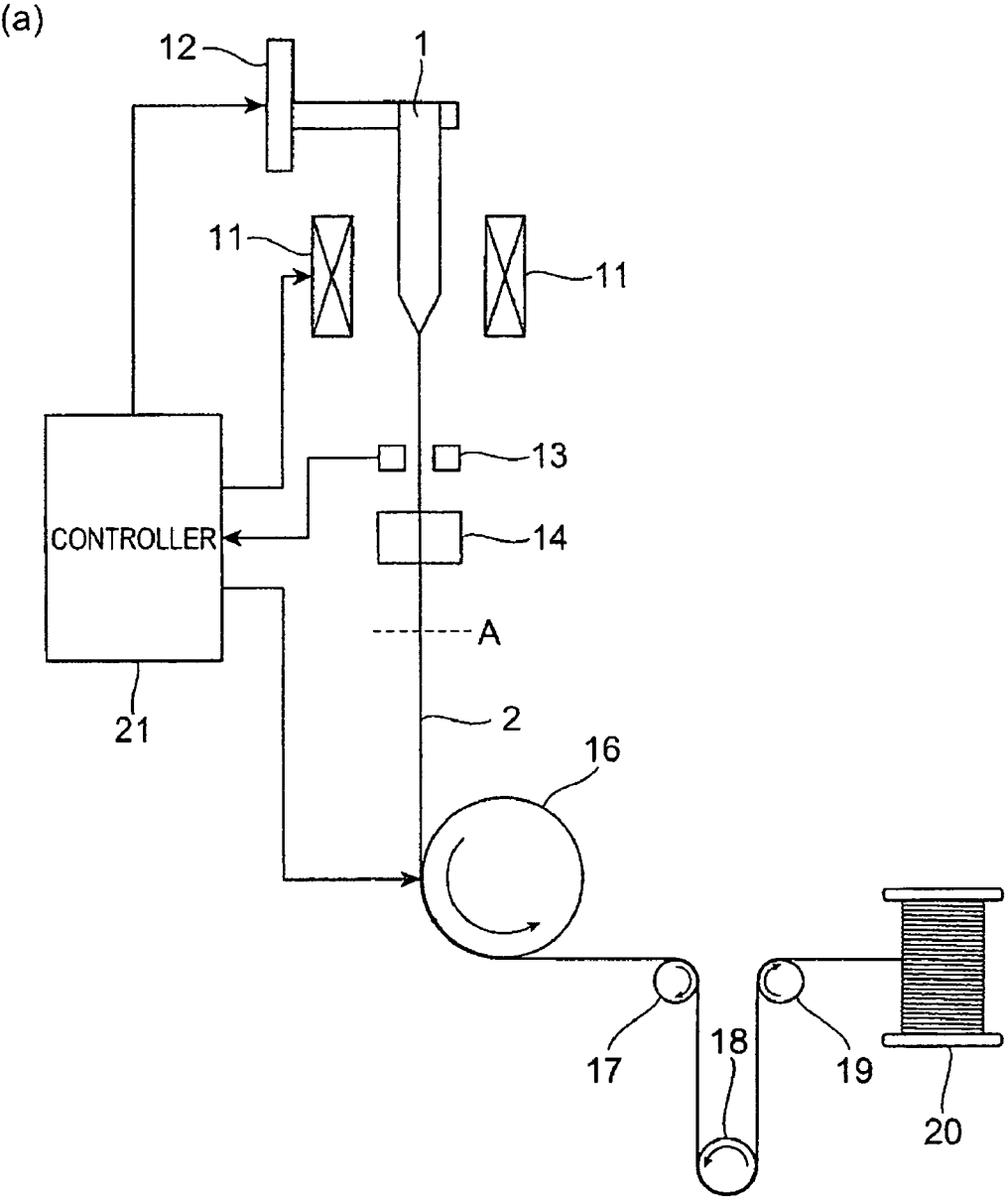
FIG. 5 is a view showing a cross-sectional structure of a drawing device for implementing the optical fiber fabricating method according to the present invention and the optical fiber that is obtained.
Figure 5:
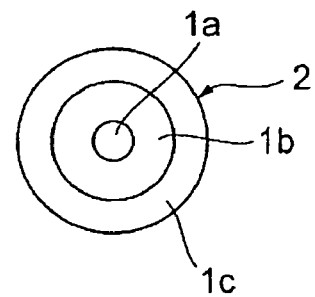

Next, the drawing step of fabricating the optical fiber by using optical fiber preform 1 that is fabricated as described above will be explained with reference to FIG. 5. The area (a) of FIG. 5 shows the schematic constitution of the drawing device for implementing the optical fiber fabricating method according to the present invention. In the case of the drawing device shown in the area (a) of FIG. 5, the optical fiber preform 1 is fixed to a preformed feeder 12 and fed into a heating furnace 11 by means of the preformed feeder 12. Further, the lower portion of the optical fiber preform 1 is heated and melted by means of the heating furnace 11. The bared optical fiber that is drawn from the molten lower part of the optical fiber preform 1 is drawn out to the outside from below the heating furnace 11.

The glass diameter d of the bared optical fiber is measured by an outer diameter measuring instrument 13 and the surface of the bared optical fiber is covered with a resin by a resin coating section 14. In other words, in the resin coating section 14, the bared optical fiber surface has an ultraviolet-cured resin applied thereto by means of a primary coating die and the ultraviolet-cured resin is cured once using ultraviolet radiation. Thereafter, the ultraviolet-cured resin is also applied to the resin surface applied to the bared optical fiber by means of a secondary coating die and, as a result of the ultraviolet-cured resin thus applied being cured by means of ultraviolet radiation, a coated optical fiber 2 is obtained. Further, the coated optical fiber 2 is wrapped around a bobbin 20 in order via a capstan 16 and rollers 17 to 19. The area (b) of FIG. 5 shows the cross-sectional form of the coated optical fiber 2 at the point A in the area (a). As shown in the area (b), the coated optical fiber 2 comprises a core region 1a located at the center, a cladding region 1b provided on the outer periphery of the core region 1a, and a resin layer 1c provided on the outer periphery of the cladding region 1b.

The information relating to the glass diameter d of the bared optical fiber measured using the outer diameter measuring instrument 13 is input to the control unit 21. While the drawing, the control unit 21 controls the heating temperature (drawing temperature) of the optical fiber preform 1 by the heating furnace 11, the speed of the capstan 16 (that is, the wire drawing speed of the coated optical fiber 2), and the supply speed of the optical fiber preform 1 by the preformed feeder 12 respectively so that the input glass diameter d approaches a preset glass diameter.

An optical fiber (coated optical fiber 2) having a core with a high refractive index is obtained by doping with $Al_2O_3$ at a high concentration in the course of the drawing step above. In the conventional optical fiber preform fabricating methods, the amount of $FeCl_3$ invading the raw material has also been increased by increasing the $AlCl_3$ raw material in order to raise the concentration of $Al_2O_3$ in the core region. Hence, it has proven difficult to remove the Fe-induced transmission loss component. However, by using the optical fiber preform that is fabricated by means of the optical fiber preform fabricating method according to the present invention, an optical fiber with a transmission loss of 20 dB/km or less is obtained. In other words, in accordance with an optical fiber fabricating method that uses the optical fiber preform that was obtained via the above fabrication steps, it is possible to fabricate fiber possessing high nonlinearity which actively utilizes the non-linearity phenomenon in addition to a transmission fiber.

In addition, by adopting countermeasures that suppress the purification of the raw materials and the growth of crystals, a transmission loss of 10 dB/km or less can be implemented with an optical fiber that is doped with $Al_2O_3$ in a high concentration of 8 wt % or more. As a result, there is the advantage that a non-linearity phenomenon can be obtained highly efficiently.

Next, a specific example of the optical fiber preform fabricating method according to the present invention will be explained. The following description is a description for a case where the optical fiber preform fabricating method according to the present invention is applied to MCVD.

Figure 6:
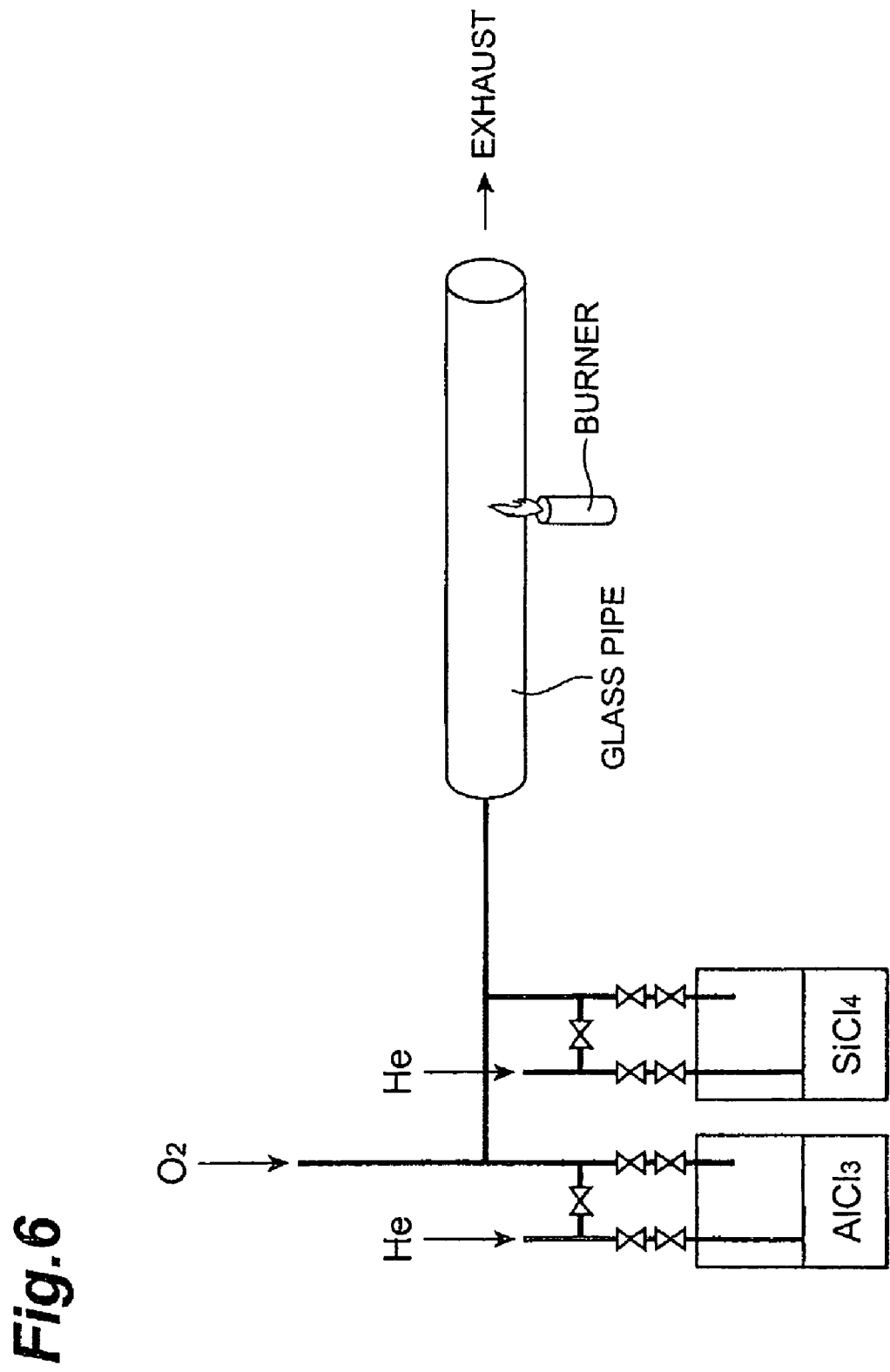
FIG. 6 is a view showing the supply of raw materials as a first specific example of the optical fiber fabricating method according to the present invention.

FIG. 6 is a view showing the supply of raw materials as a first specific example of the optical fiber preform fabricating method according to the present invention. In the first specific example, as shown in FIG. 6, He-gas is employed as the carrier gas, $AlCl_3$ and $SiCl_4$ are fed into the glass pipe, and $O_2$-gas is also fed into the glass pipe. The temperature of the bubbler used for the $AlCl_3$ is set at 140° C. and the temperature of the bubbler used for the $SiCl_4$ is set at 40° C. In order to supply the $AlCl_3$ as gas, the temperature of the $AlCl_3$ bubbler must be 100° C. or more. However, when the temperature of the bubbler is too high, the vapor pressure of the $FeCl_3$ contained in the $AlCl_3$ raw material is then also high. In this case, an increase in the Fe-incorporation is induced and, therefore, the temperature of the $AlCl_3$ bubbler is preferably 150° C. or less. The temperature of the $AlCl_3$ bubbler is more preferably 140° C. or less.

Figure 7:
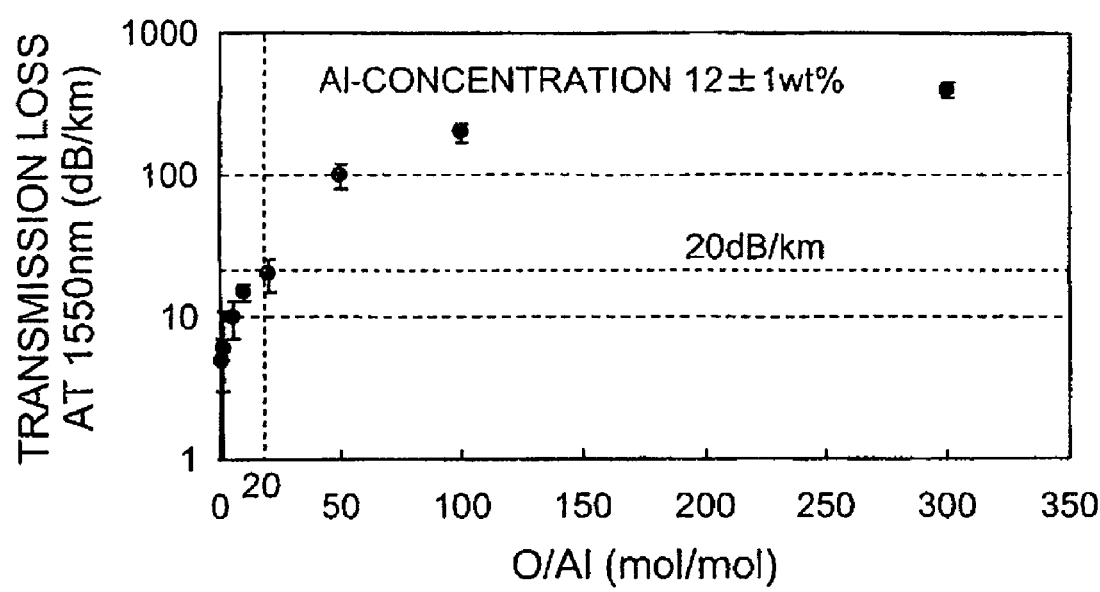
FIG. 7 is a view showing the transmission loss at a wavelength of 1550 nm of an optical fiber that was fabricated using the optical fiber preform obtained by the first specific example.

The He-carrier feed rate is adjusted so that the $AlCl_3$ input feed rate is 10 cc/min and the $SiCl_4$ input feed rate is 5 cc/min. The glass soot body is synthesized within the glass pipe while changing the molar ratio O/Al by changing the $O_2$ feed rate. A core rod of optical fiber preform (glass region that is to be at least part of the core region of the optical fiber) is obtained by sintering the deposited glass soot body and by collapsing the glass pipe. In addition, by sequentially forming a glass region on the outer periphery of the core rod thus obtained, an optical fiber preform 1 with the desired refractive index distribution is obtained. An Al-doped optical fiber is obtained by drawing the optical fiber preform. FIG. 7 is a graph showing the transmission loss at a wavelength of 1550 nm of an Al-doped optical fiber that was obtained by the first specific example. In FIG. 7, the Al-concentration of each optical fiber was on the order of 12±1 wt % for all the O/Al ratios.

As shown in FIG. 7, when the molar ratio O/Al exceeds 20, the transmission loss at a wavelength of 1550 nm becomes 20 dB/km or more. In contrast, when the molar ratio O/Al is 20 or less, the transmission loss at a wavelength of 1550 nm can be kept at 20 dB/km or less. In addition, when the optical fiber preform fabricating method is applied after raw material purification has been performed with respect to the $AlCl_3$ supply line using a trap that utilizes the temperature difference or a physical filter (a membrane filter comprising a tetrafluoride resin, for example), an optical fiber with a greater transmission loss reduction is obtained.

A MCVD starting pipe is preferably a glass pipe with a lower viscosity than pure $SiO_2$. This makes it possible to prevent ovalization of the glass pipe when the diameter of the glass pipe is compressed. In addition, in cases where an Al-doped glass is synthesized using MCVD, $SiO_2$ evaporates from the inside of the heated starting glass pipe and invades the deposited $Al_2O_3$. Based on this fact, the introduction of $SiCl_4$ is not preferably in cases where an Al-concentration of 15 wt % or more is to be obtained.

Figure 8:
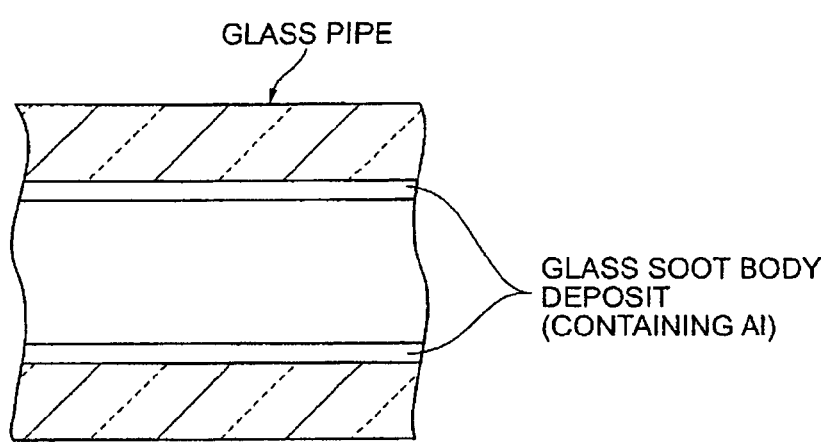
FIG. 8 is a view showing the cross-sectional structure of the glass pipe in order to illustrate a variety of modified examples by means of the deposition step shown in the area (a) of FIG. 2 and the area (a) of FIG. 3.
Figure 8:
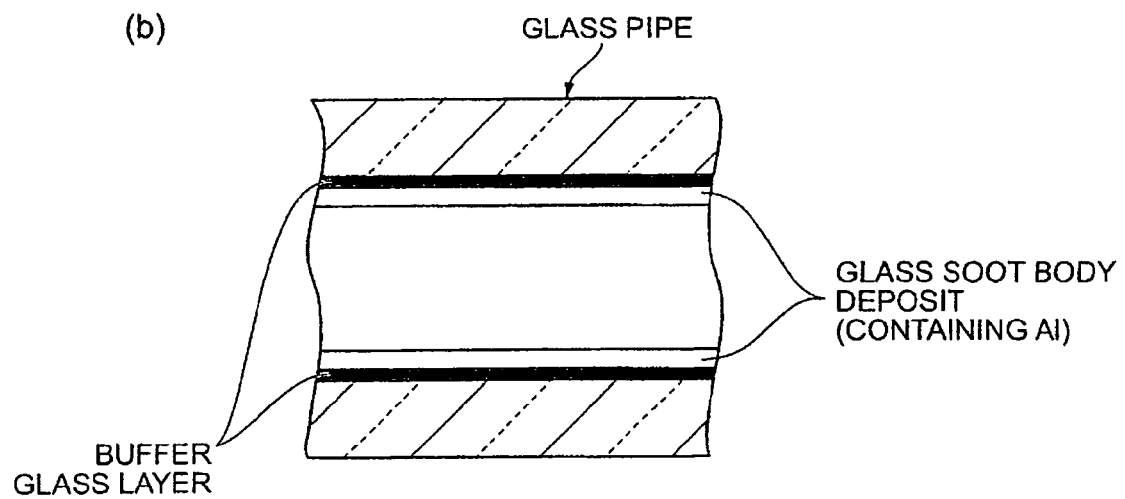

In addition, the MCVD starting pipe is preferably a glass pipe with a lower viscosity than Al-doped glass which is to form at least part of the core region of the optical fiber as shown in the area (a) of FIG. 8. As a result, the shaping of the Al-doped glass which is to form the core portion as a noncircle during the collapsing of the glass pipe (see the area (d) of FIG. 2 and the area (d) of FIG. 3) is effectively suppressed. In cases where the viscosity of the glass pipe is reduced, silica glass doped with at least any of fluorine, chlorine, and phosphorus may be utilized for the glass pipe.

Furthermore, in cases where a glass pipe of low viscosity is applied as the MCVD starting pipe, a buffer glass layer of high viscosity is preferably deposited on the inside wall of the glass pipe prior to depositing the Al-doped glass as shown in the area (b) of FIG. 8. The buffer glass layer at least has a higher viscosity than the glass pipe. Normally, in the case of a preform structure in which Al-doped glass makes direct contact with a low viscosity glass pipe, when the Al-doped glass to be the core region crystallizes during the preform fabrication, fluctuations in the core-cladding interface in the longitudinal direction are readily induced in the optical fiber that is obtained after the drawing. In this case, degradation of the transmission loss of the optical fiber obtained is unavoidable. The buffer glass layer reduces the degradation of the transmission loss and is therefore provided between the low viscosity glass pipe and the Al-doped glass. For example, in cases where a glass pipe doped with fluorine is applied as the MCVD starting pipe, by depositing a buffer glass layer comprised of mostly pure silica on the inside wall surface of the glass pipe prior to synthesis with the Al-doped glass, a buffer glass layer with a higher viscosity than the glass pipe can be disposed between the glass pipe and the Al-doped glass. Further, the thickness of the buffer glass layer comprised of pure silica is preferably 50 μm or more. This is because, in cases where the thickness of the buffer glass layer is less than 50 μm, the Al in the Al-doped glass is diffused toward the buffer glass layer during the preform fabrication and during the preform drawing (during the optical fiber fabrication), and, therefore, the effects of the buffer glass layer are not adequately obtained.

Figure 9:
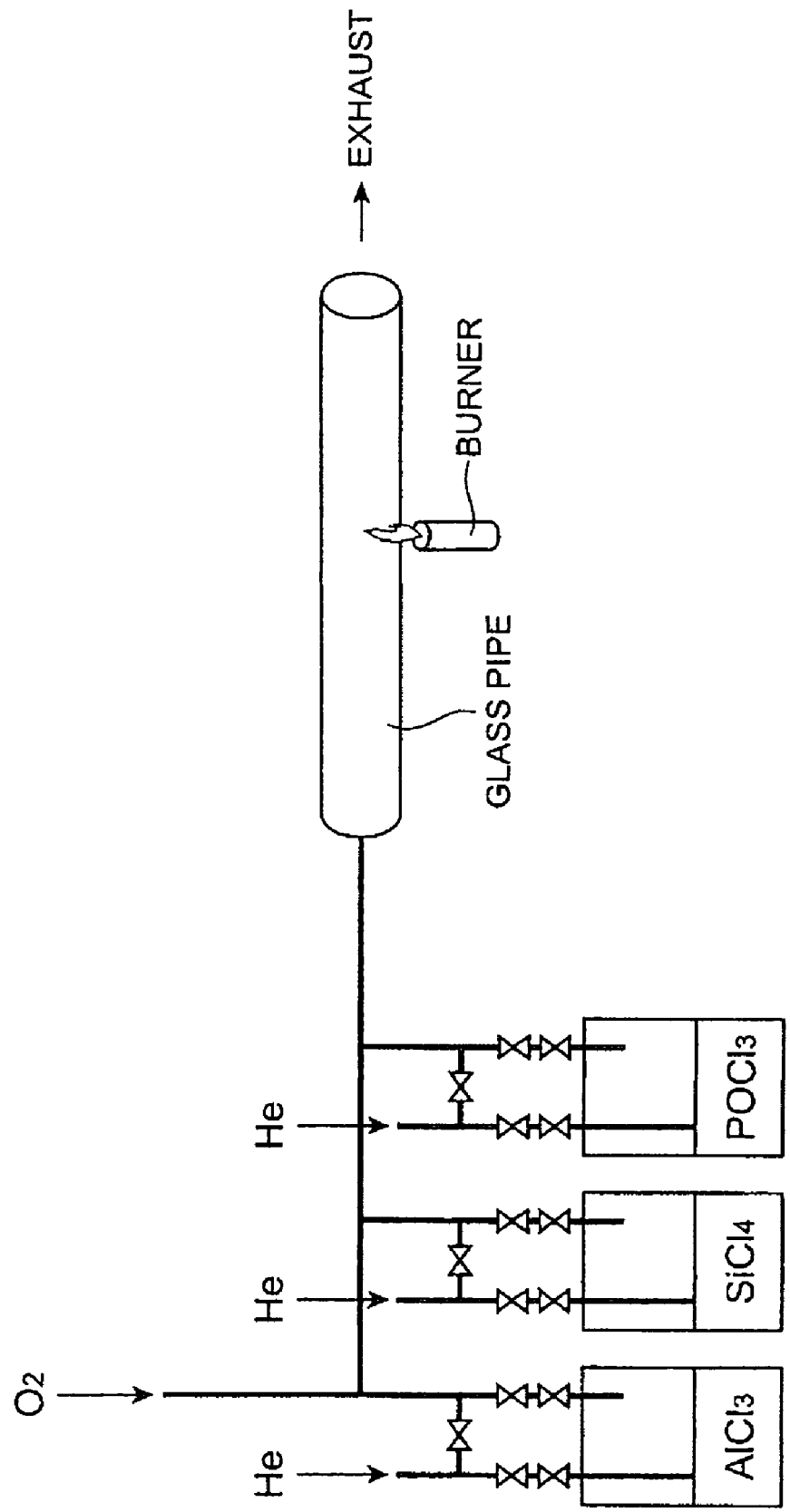
FIG. 9 is a view showing the supply of raw materials as a second specific example of the optical fiber preform fabricating method according to the present invention.

FIG. 9 is a view showing the supply of raw materials as a second specific example of the optical fiber preform fabricating method according to the present invention. In the second specific example, as shown in FIG. 9, $AlCl_3$, $SiCl_4$, and $POCl_3$ are fed into the glass pipe by using He-gas as the carrier gas and $O_2$-gas is also fed into the glass pipe. The $POCl_3$ feed rate was changed in a state where the $AlCl_3$ feed rate was fixed at 15 cc/min, the $SiCl_4$ feed rate was fixed at 10 cc/min, and the feed rate of $O_2$ was fixed at 10 cc/min. An optical fiber preform was fabricated by depositing twenty layers of glass thin layer on the inside of the glass pipe in a state where the traverse speed of the burner is set at 150 mm/in.

Figure 10:
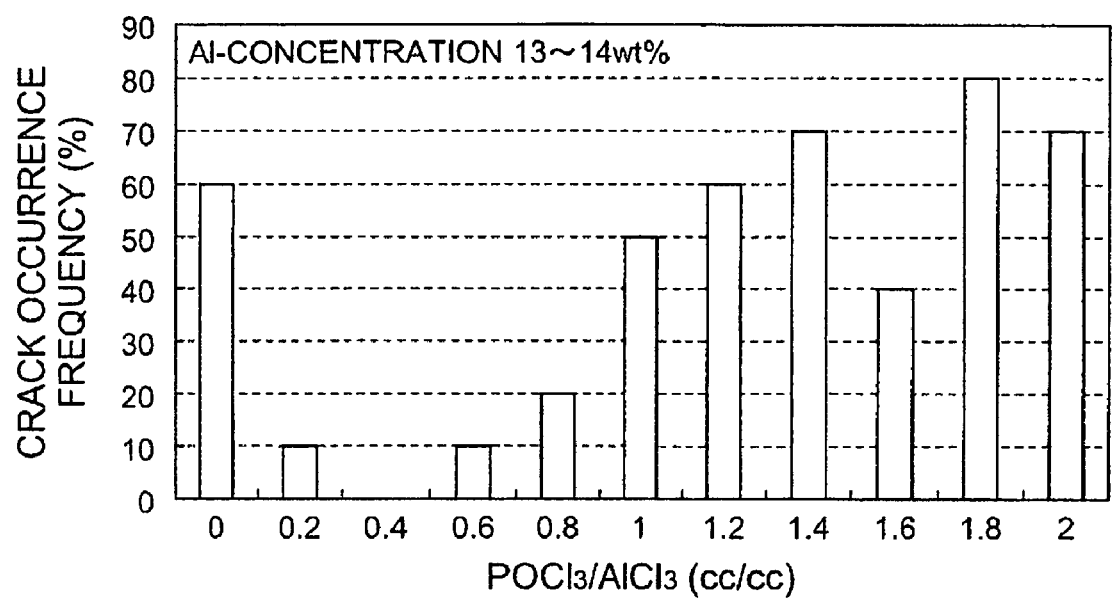
FIG. 10 is a graph showing the frequency with which cracks occur in the glass that was deposited in the cooling step during glass deposition and after glass deposition according to the second specific example.

FIG. 10 is a graph showing the frequency with which cracks occur in the glass deposit in the cooling step during glass deposition and after glass deposition according to the second specific example. As can be seen from FIG. 10, in cases where no P has been doped, the crack occurrence frequency is high at 60%. In contrast, in cases where the flow rate ratio ($POCl_3/AlCl_3$) is set at '$0<POCl_3/AlCl_3<1$', the crack frequency decreases markedly to 20% or less. However, the frequency of cracks also rises when the flow rate ratio ($POCl_3/AlCl_3$) is 1 or more. The frequency of cracks is also dependent on the thickness of the glass layer and, in cases where the number of glass layers is not more five layers under the flow rate conditions, the frequency with which cracks occur also decreases greatly at any flow rate ratio $POCl_3/AlCl_3$. The P co-doping may be performed when fabricating a large optical fiber preform.

Although the above embodiment assumes usage of the MCVD method, the present invention is also valid in cases where the VAD, OVD, or PCVD method is used.

From the invention thus described, it will be obvious that the embodiments of the invention may be varied in many ways. Such variations are not to be regarded as a departure from the scope of the invention, and all such modifications as would be obvious to one skilled in the art are intended for inclusion within the scope of the following claims.

INDUSTRIAL APPLICABILITY

The optical fiber preform fabricating method according to the present invention can be applied to a variety of glass synthesis methods such as VAD, OVD, PCVD, in addition to MCVD.

The invention claimed is:

1. A method of fabricating an optical fiber preform that comprises a central glass region to be a core region of an optical fiber and a peripheral glass region to be a cladding region of the optical fiber, said method comprising a glass synthesis step of synthesizing glass containing Al-element to form a region constituting at least part of the central glass region to be the core region, by applying heat or a high frequency electro magnetic field to a mixed gas that satisfies a mole content ratio, O/Al, of 1.5 or less in a glass synthesizing zone, wherein O is O-element and Al is Al-element.

2. The method according to claim 1, wherein said glass synthesis step includes:

a deposition step of synthesizing a glass soot body containing the Al-element on an inside wall of a glass pipe by feeding the mixed gas into the glass pipe; and a consolidation step of obtaining a transparent glass body from the glass soot body by heating the glass soot body.

3. The method according to claim 2, wherein the glass pipe has a lower viscosity than the glass soot body.

4. The method according to claim 3, further comprising a step, carried out prior to said deposition step, of depositing a buffer glass layer with a higher viscosity than the glass pipe onto the inside wall of the glass pipe, wherein the glass soot body is formed on the surface of the buffer glass layer.

5. The method according to claim 2, further comprising a purification step, provided between said deposition step and said consolidation step, of removing impurities contained in the glass soot body by exposing the glass soot body synthesized in said deposition step to a Cl-gas atmosphere.

6. The method according to claim 2, further comprising a doping step, provided between said deposition step and said consolidation step, of doping the glass soot body synthesized in said deposition step with a doping element other than Al by exposing the glass soot body to a gas atmosphere that contains the doping element.

7. The method according to claim 2, wherein, in said deposition step, a glass soot body containing the Al-element and another element other than Al are synthesized by depositing glass particles by means of chemical vapor deposition inside the glass pipe while feeding said another element into the glass pipe in use of a carrier gas other than an oxygen gas.

8. The method according to claim 2, wherein the mixed gas supplied in said deposition step contains $AlCl_3$ and temperature of a bubbler for supplying the $AlCl_3$ is 150° C. or less.

9. The method according to claim 1, wherein said glass synthesis step includes a step of synthesizing a glass layer containing the Al-element on an inside wall of a glass pipe by feeding the mixed gas into the glass pipe.

10. The method according to claim 9, wherein the glass pipe has a lower viscosity than the glass soot body.

11. The method according to claim 10, further comprising a step, carried out prior to said deposition step, of depositing a buffer glass layer with a higher viscosity than the glass pipe onto the inside wall of the glass pipe, wherein the glass soot body is formed on the surface of the buffer glass layer.

12. The method according to claim 1, wherein said glass synthesis step includes:

a deposition step of synthesizing a glass soot body that contains the Al-element on a starting material placed inside a reacting furnace by feeding the mixed gas inside the reacting furnace; and a consolidation step of obtaining a transparent glass body from the glass soot body by heating the glass soot body.

13. A method of fabricating an optical fiber, said method comprising the steps of:

preparing an optical fiber preform that is fabricated by the method according to claim 1; and drawing the optical fiber preform thus prepared.

* * * * *